United States Patent
Brashers

(10) Patent No.: US 10,789,597 B2
(45) Date of Patent: Sep. 29, 2020

(54) SYSTEMS AND METHODS FOR USING A DISTRIBUTED LEDGER FOR DATA HANDLING

(71) Applicant: R-STOR INC., Saratoga, CA (US)

(72) Inventor: Per W. Brashers, Oakland, CA (US)

(73) Assignee: R-STOR INC., Saratoga, CA (US)

( * ) Notice: Subject to any disclaimer, the term of this patent is extended or adjusted under 35 U.S.C. 154(b) by 371 days.

(21) Appl. No.: 15/711,394

(22) Filed: Sep. 21, 2017

(65) Prior Publication Data
US 2018/0082296 A1    Mar. 22, 2018

Related U.S. Application Data

(60) Provisional application No. 62/397,911, filed on Sep. 21, 2016.

(51) Int. Cl.
| | |
|---|---|
| G06Q 20/40 | (2012.01) |
| H04L 29/06 | (2006.01) |
| G06F 16/22 | (2019.01) |
| H04L 9/32 | (2006.01) |
| H04L 29/08 | (2006.01) |

(52) U.S. Cl.
CPC ....... G06Q 20/405 (2013.01); G06F 16/2246 (2019.01); G06F 16/2255 (2019.01); H04L 9/3236 (2013.01); H04L 63/0428 (2013.01); *G06F 2221/0775* (2013.01); *G06Q 2220/00* (2013.01); *H04L 67/1097* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2016/0028552 A1 | 1/2016 | Spanos et al. | |
| 2016/0254906 A1 | 9/2016 | Castellucci et al. | |
| 2016/0364787 A1* | 12/2016 | Walker | G06Q 30/0635 |
| 2017/0039330 A1* | 2/2017 | Tanner, Jr. | G06F 19/328 |
| 2017/0075938 A1* | 3/2017 | Black | G06F 21/602 |
| 2017/0357966 A1* | 12/2017 | Chandrasekhar | G06Q 20/3829 |
| 2018/0047111 A1* | 2/2018 | Vieira | G06Q 40/12 |
| 2018/0060836 A1* | 3/2018 | Castagna | G06Q 20/10 |

(Continued)

OTHER PUBLICATIONS

Wilkinson, Shawn, "Storj a Peer-to-Peer Cloud Storage Network," Dec. 15, 2014, pp. 1-18.

(Continued)

*Primary Examiner* — Scott S Trotter
(74) *Attorney, Agent, or Firm* — Squire Patton Boggs (US) LLP

(57) ABSTRACT

In some embodiments, a method may include establishing a set of distributed ledgers. Each distributed ledger (or blockchain) may include a unique root key that is specific to the client. A series of rules for data handling and/or manipulation may be produced, and the data is handled according to such rules. An entry may be added to the ledger for each transaction, and the ledger is distributed to those end point associated with the client. In the event of an invalid (or unauthorized) transaction, a "side branch" (or "fault branch") may be added to the ledger, thus easily identifying the transaction as being invalid to the client.

18 Claims, 12 Drawing Sheets

(56) References Cited

U.S. PATENT DOCUMENTS

2018/0068130 A1* 3/2018 Chan .................. G06F 21/6227

OTHER PUBLICATIONS

Bhargavan, Karthikeyan, "Markle Hash Trees for Distributed Audit Logs Subject proposed by Karthikeyan Bhargavan," Apr. 7, 2015, pp. 1-5.
Dec. 12, 2017 International Search Report and Written Opinion issued in International Patent Application No. PCT/US2017/052688.
International Preliminary Report on Patentability and Written Opinion, International Application No. PCT/US2017/052688 dated Mar. 26, 2019.

* cited by examiner uQQL Policies

Create
Namespace  top level policies that objects below adhere to
           collections belong to namespaces, but can have finer granularity of
  collection  policies
  dataset     datasets may contain objects from multiple collections (sharing)
  object      atomic unit that goes into the above
  sharing key create a pub/priv key pair for a dataset          1GB increments          returns a durable key
  site        create a definition of a site
  sovereign
  site        create a definition of ultra-secure site          precondition, secureSite must have been created
  secure site create definition of a site that has super powers Bind
  make an association between two constructs           use the 'to' construct
    Namespace
    collection
    dataset
    object
                                                site                                    meaning: bind 'collections' to site 'xxx' and
                                                                                        'yyy' and 'jjk'
                                                                                        bind namespace HR to Germany (note nothing
                                                                                        in the namespace HR can be access outside
                                                                                        sites in the sovereign site list Germany)
                                                sovereign site
                                                secure site                             application integration point with a
                                                Protocol                                NameSpace, e.g. HDFS, UFS, S3,
                                                sharing key                             binds the specified key to a collection

Fig. 6 uOQL Policies Cont.

Open                    prep for I/O
    Namespase
    collection
    dataset
    object close                   send 'EOF'
    Namespase
    collection
    dataset
    object delete                  self explanatory, cannot override a retain or lock policy
    Namespace           cannot be executed if there is anything in the NS
    collection
    dataset
    object
    sharing key
    site
    sovereign site
    secure site

Fig. 7

Fig. 8 uQL Operands

| | | |
|---|---|---|
| to | specify a site as a destination of a policy | copy <> to site1 |
| find | search metadata tags for all objects that match, returns a new collection ID | |
| and | logical and | |
| or | logical or | |
| not | logical not | |
| pattern | option to find, to seek inside the objects in a collection for a string or byte stream | |
| # | creates 60 char user definable string, many may be applied to a object through namespace | |

Fig. 10

SYSTEMS AND METHODS FOR USING A DISTRIBUTED LEDGER FOR DATA HANDLING

CROSS REFERENCE TO RELATED APPLICATION

This application claims priority to U.S. Provisional Application No. 62/397,911 filed on Sep. 21, 2016. The entire contents of the above-referenced provisional application in hereby incorporated by reference.

BACKGROUND

Field

Certain embodiments described herein may relate to systems and methods for using a distributed ledger for data handling. More particularly, certain embodiments described herein may relate to the use of a blockchain to provide an auditable, visible record of metadata associated with data transactions.

Description of the Related Art

The rise of cloud computing has led to dramatic improvements in efficiently storing, processing, and handling large amounts of data. One of the fundamental tenets of cloud computing is that data can be stored and/or processed without regard to physical or geographic boundaries. Thus, instead of having a set of dedicated servers on premises, an enterprise can have access to the "cloud," which includes data centers around the world. The benefits of clouding computing include reduced data storage cost, multi geography access, and increased productivity.

One drawback of the current cloud infrastructure, however, is that the stored data can be subject to breaches in data security. For example, there have been many instances where a hacker (or unauthorized user) has gained access to sensitive data (e.g., credit card numbers, financial data, or the like) in the cloud. Other security risks include improper use of the data by an authorized user (e.g., an employee who downloads competitive data prior to resigning), malware attacks that infiltrate the cloud storage, and the like.

Another drawback of the current cloud infrastructure is that certain government data sovereignty regulations can compromise data stored in certain regions. To mitigate this risk, some countries have imposed regulations requiring that certain data (e.g., personal data for citizens) be maintained on servers located in that country.

Although data security can be improved by adding additional layers of security or validation, such additional measures erode the efficiency of the cloud. Similarly, although the issue of data sovereignty can possibly be addressed by maintaining cloud servers only in certain countries, this would require continued review for new regulations, and the like. Moreover, storing data in traditional cloud infrastructures does not allow for auditing, thus is unacceptable to most enterprises and governments. For example, Amazon has built a "private cloud" for the US government to address this deficiency.

Thus, a need exists for improved systems and methods for processing and storing data in the cloud.

SUMMARY

According to a first embodiment, a method for handling data with distributed ledgers in an integrated cloud-computing network may include creating, at a network node, a set of distributed ledgers of transactions associated with a client of the integrated cloud-computing network. The method may also include storing and handling data corresponding to the transactions according to a series of predefined rules. The method may further include validating the transactions to see if the transactions comply with the series of predefined rules. In addition, the method may include adding an entry to a ledger of the set of distributed ledgers for each valid transaction, and adding a side branch to the ledger of the set of distributed ledgers for each invalid transaction. Further, the method may include distributing the set of distributed ledgers to an endpoint associated with the client.

In an embodiment of the method, each distributed ledger of the set of distributed ledgers comprises a unique root key that is specific to the client. In another embodiment of the method, the series of predefined rules may include cryptographic rules, geographic rules, longevity rules, durability rules, or retention rules. In a further embodiment of the method, the method may include maintaining the data corresponding to the transactions for the client and data corresponding to other transactions for at least another client in separate ledgers. According to another embodiment of the method, the method may include managing the set of distributed ledgers by implementing an object query language module, a hash tree module, and a blockchain module. In other embodiments of the method, the object query language module may be configured to receive a series of rules for the data handling, the hash tree module may be configured to produce a hash tree construct that records information about each transaction, and the blockchain module may be configured to produce a shared ledger that includes an entry representing each transaction.

A second embodiment may be directed to an apparatus. The apparatus may include at least one processor, at least one memory including computer program code. The at least one memory and the computer program code are configured to, with the at least one processor, cause the apparatus at least to create, at a network node, a set of distributed ledgers of transactions associated with a client of the integrated cloud-computing network, store and handle data corresponding to the transactions according to a series of predefined rules, validate the transactions to see if the transactions comply with the series of predefined rules; add an entry to a ledger of the set of distributed ledgers for each valid transaction, add a side branch to the ledger of the set of distributed ledgers for each invalid transaction, and distribute the set of distributed ledgers to an endpoint associated with the client.

In an embodiment of the apparatus, each distributed ledger of the set of distributed ledgers may include a unique root key that is specific to the client. In another embodiment of the apparatus, the series of predefined rules comprises cryptographic rules, geographic rules, longevity rules, durability rules, or retention rules. In a further embodiment of the apparatus, the at least one memory and the computer program code may be further configured to, with the at least one processor, cause the apparatus at least to maintain the data corresponding to the transactions for the client and data corresponding to other transactions for at least another client in separate ledgers.

In yet another embodiment of the apparatus, the at least one memory and the computer program code may be further configured to, with the at least one processor, cause the apparatus at least to manage the set of distributed ledgers by implementing an object query language module, a hash tree module, and a blockchain module. According to another embodiment of the apparatus, the object query language module may be configured to receive a series of rules for the data handling, the hash tree module may be configured to produce a hash tree construct that records information about each transaction, and the blockchain module may be configured to produce a shared ledger that includes an entry representing each transaction.

A third embodiment is directed to a computer program. The computer program may be embodied on a non-transitory computer readable medium, the computer program, when executed by a processor, causes the processor to create, at a network node, a set of distributed ledgers of transactions associated with a client of the integrated cloud-computing network, store and handle data corresponding to the transactions according to a series of predefined rules, validate the transactions to see if the transactions comply with the series of predefined rules, add an entry to a ledger of the set of distributed ledgers for each valid transaction, add a side branch to the ledger of the set of distributed ledgers for each invalid transaction, and distribute the set of distributed ledgers to an endpoint associated with the client.

In an embodiment of the computer program, each distributed ledger of the set of distributed ledgers may include a unique root key that is specific to the client. In another embodiment of the computer program, the series of predefined rules may include cryptographic rules, geographic rules, longevity rules, durability rules, or retention rules. In yet another embodiment of the computer program, the computer program, when executed by a processor, may further cause the processor to maintain the data corresponding to the transactions for the client and data corresponding to other transactions for at least another client in separate ledgers. According to another embodiment of the computer program, the computer program, when executed by a processor, may further cause the processor to manage the set of distributed ledgers by implementing an object query language module, a hash tree module, and a blockchain module. In another embodiment of the computer program, the object query language module may be configured to receive a series of rules for the data handling, the hash tree module may be configured to produce a hash tree construct that records information about each transaction, and the blockchain module may be configured to produce a shared ledger that includes an entry representing each transaction.

BRIEF DESCRIPTION OF THE DRAWINGS

For proper understanding of the invention, reference should be made to the accompanying drawings, wherein:

FIGS. 6-10 depict the policies, operations, and operands of an object query language module according certain embodiments.

DETAILED DESCRIPTION

Figure 1:
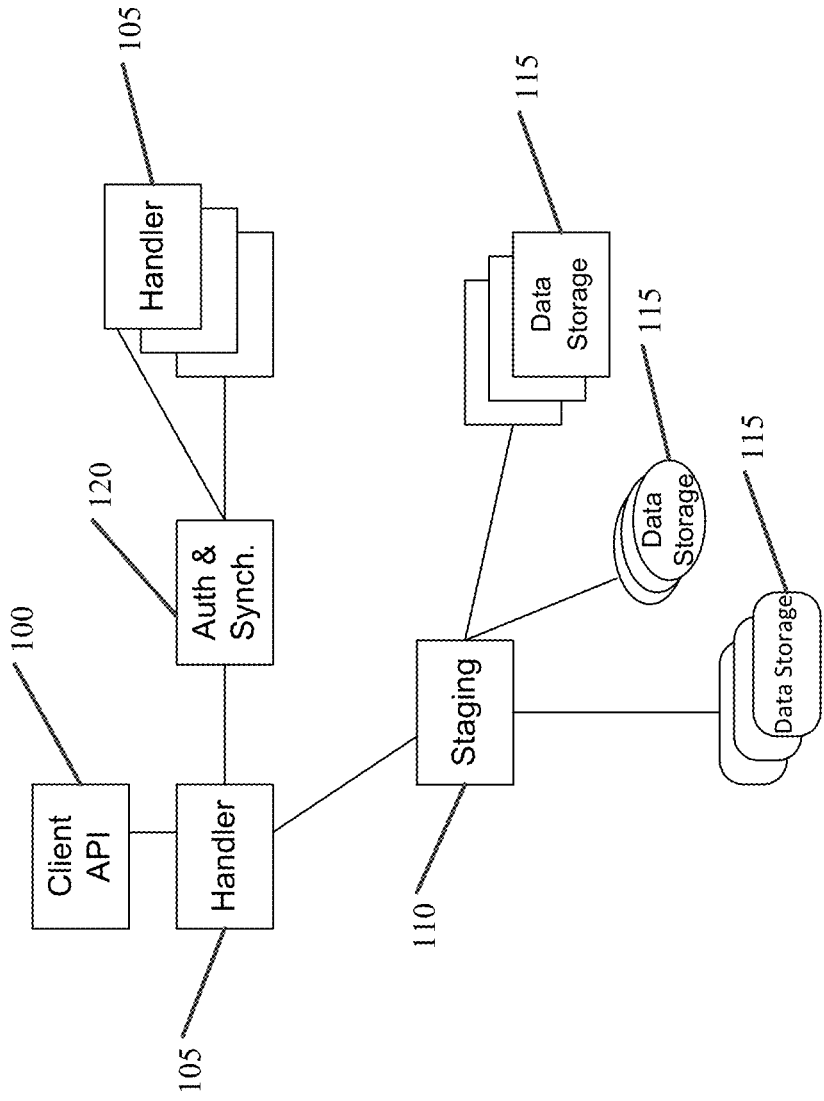
FIG. 1 illustrates a deployment architecture of a blockchain cloud integration according to certain embodiments.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

As used herein, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

The embodiments described herein address the need for systems to preserve data integrity in view of data sovereignty regulations, and provide simple and efficient way to verify and validate transactions involving data storage and/or processing. According to certain embodiments, a method may be provided to address issues of data reliability, availability and scalability in a manner that meets the needs of enterprises and governments alike. Implementation of a distributed ledger with an appropriate rules based and application programming interface (API) may obtain this level of transaction transparency and auditability. Further, scalability may be achieved by having unique, individually signed ledgers for each client, and a central ledger to track/enable cross ledger activities.

In some embodiments, a method may include establishing a set of distributed ledgers. Each distributed ledger (or blockchain) may include a unique root key that is specific to the client. A series of rules for data handling and/or manipulation may be produced, and the data may be handled according to such rules. An entry may be added to the ledger for each transaction, and the ledger may be distributed to those end points associated with the client. In the event of an invalid (or unauthorized) transaction, a "side branch" (or "fault branch") may be added to the ledger, thus easily identifying the transaction as being invalid to the client.

In some embodiments, an apparatus may include a blockchain data handler configured to manage a distributed ledger for data transactions, as described herein. The blockchain data handler may be implemented in at least one of a memory or a processor, and may include an object query language (OQL) module, a hash (or Merkle) tree module and a blockchain module. The object query language module may be configured to receive a series of rules for the handling of data. Further, the hash tree module may be configured to produce a hash tree construct that records information about each transaction. The hash tree module may enable "proof of existence" in connection with each data transaction by producing a hash (or identifier) associated with each valid transaction. The hash tree module also produces a "branch" from the chain to isolate and/or identify any unauthorized transactions (or faults). In certain embodiments, the blockchain module may be configured to produce a shared ledger that includes an entry or "block" representing each transaction. In other embodiments, the shared ledger provides an immutable, auditable record of all transactions.

According to certain embodiments, the hash tree module may be modified where in an event of a ledger block becoming corrupt, either through machine error or external pressure such as a hacker, the block hash is no longer valid. At this juncture, it may be possible to elect to destroy the invalid ledger block and replace it with a valid one. In certain embodiments, this may be accomplished either programmatically or through pulling the ledger block from the object repository. Alternatively, this issue may be resolved by creating a new unique root for the ledger block, and isolating the transactions to a separate chain. These transactions may be held in isolation and the data access requests may be sent to a honeypot. With such a modified hash tree module, it may be possible to provide enough time to identify and locate the hacker or threat, and prevent any further corruption of ledger blocks.

In some embodiments, a non-transitory processor readable medium storing code representing instructions to be executed by a processor includes code to cause the processor to determine receive information associated with a data transaction that relates to a user. The code further includes code to determine whether the transaction is consistent with and/or in conformance with a set of rules. An entry (or "block"), which, in certain embodiments, may include a collection of entries, may be added to a chain associated with the user when the transaction is determined to be in conformance with the set of rules. The code may further include code to produce a side chain from the primary chain when the transaction is determined to be noncompliant with the set of rules. In certain embodiments, if the user is a valid, authorized user, but the transaction is not allowed, the transaction or request for the transaction will be denied, and an error message may be sent. In an embodiment, the error message may include an error message of "not allowed."

According to certain embodiments, blockchain is a methodology that is applicable to any online digital transaction. The blockchain methodology involves creating a digital ledger that is distributed among the network participants. The participants are able to manipulate the ledger in connection with a transaction in accordance with cryptographic rules. Thus, the validity of each transaction can be verified without the need for a trusted third party. In the context of a financial transaction (e.g., Bitcoin), blockchain methodology obviates the need for a trusted third party, such as a bank or PayPal, to verify each transaction. Rather, each transaction is protected and/or verified via cryptography (i.e., a digital signature). Upon being validated, each transaction is then recorded onto the ledger that is then shared with all of the network participants. Said another way, a record of each transaction is added as a new "block" to the "chain," which is then shared with all participants.

According to certain embodiments, the ledger may include metadata. For security, the metadata may be encrypted with a separate keyset and stored in a manner that makes it impossible to know where one keyspace ends and another begins. In certain embodiments, the metadata in each signed block may be as immutable as the data itself, with the exception that masks may be applied. For instance, in certain embodiments, if metadata is updated, a non-audit user may be shown only the last update, not all the previous ones. In other embodiments, metadata may be broken down into fields or categories. One category may be system generated data, such as, for example, sub-component recovery after a server loss. Another category may be user generated metadata. User generated metadata may be stored in key-value pairs in a new record into the ledger for a given object ID. Thus, according to certain embodiments, the ledger may be updated in the following conditions: write (either new data or metadata update); and for any access to the data (user request or machine generated).

In certain embodiments, services implementing the hash tree module or blockchain module may be broken up differently. For instance, according to certain embodiments, services may be broken up into data services and metadata services. Data services may utilize OQL to apply layout rules (data sovereignty and durability, such as, for example, replicas or erasure coded). These layouts may then be committed as part of an object's transaction. According to certain embodiments, the metadata may be gathered into a transaction that is merged into a pending transactions block. That pending transactions block may be hashed together with the current end of the chain ledger block to form a new end of the chain ledger block. Further, each new ledger block may have pointers to the previous block and the pending transactions block. In addition, in certain embodiments, the ledger blocks may be added to the Merkel tree as they are created, creating a validation of linkage proof. Thus, if a block is modified, the Merkel tree may be instantly changed. As such, any errors may be detected.

According to certain embodiments, the Merkel trees can be split into smaller and smaller trees to find the exact location of the error. Correcting the error may either be done programmatically, or as ledger blocks that are treated like data (immutable) where a replacement block may be retrieved from a data store.

FIG. 1 is a schematic illustration showing a deployment architecture of a blockchain cloud integration system (or network) according to certain embodiments. The blockchain network may include the devices and/or modules shown thereon. According to certain embodiments, the deployment architecture may include a client API 100. The client API may provide access for management, metadata operations, and data operations. Further, rules may be applied to the components of the deployment architecture of FIG. 1 such that a subset of these actions may be allowed from a given instantiation. This may create access location-aware or protocol aware restrictions. It may also allow for the creation of restricted user rights. For instance, in certain embodiments, a user may be allowed only to put data and not to be able to read it back. Even further, in other embodiments, a user may have permissions to use data but not make management configuration changes.

In certain embodiments, the deployment architecture of FIG. 1 may also include one or more blockchain handlers 105. According to certain embodiments, the blockchain handlers 105 may be physical machines with associated storage. In other embodiments, the blockchain handlers 105 may be virtual machines. According to certain embodiments, the blockchain handlers 105 may act as a read cache, and help in staging data for object storage.

The deployment architecture of FIG. 1 may further include a staging unit 110. The staging unit, according to certain embodiments, may assist the blockchain handlers in getting access to an object store by making copies available in a low-latency geographically distributed manner, and in optimizing the bandwidth between it and the blockchain handlers 105. The staging unit 110 may also work in conjunction with each other to make the experience of the end-point better, while reducing the burden on network transfers.

Also illustrated in FIG. 1 is one or more data storage nodes 115. The data storage nodes 115 may fall into multiple categories that are optimized for long-term durability. For example, some of these categories may be for active transactions and, thus, may be fast, while other categories may be for archival storage. In other embodiments, the data storage nodes 115 may be on a foreign cloud.

The deployment architecture of FIG. 1 may further include authentication and synchronization service nodes 120. The authentication and synchronization service nodes 120 may be responsible for making sure the ledger is updated accurately and reliably. The authentication and synchronization service nodes 120 may also ensure that replica ledgers are made for hot-blocks, and that users are accessing the components they are allowed to access. For instance, if a ledger is being accessed from multiple locations, or by a multitude of clients at a location, the hot-blocks may need replicas created in order to service the IO requests.

In some embodiments, a single entity (or service provider) can maintain ownership and/or control over the entire network. Said another way, in some embodiments, a single entity (or service provider) can maintain ownership and/or control over all of the devices and/or modules shown, except for the client end points (e.g. identified as "client API" in FIG. 1). In this manner, the processes of data management described herein are less susceptible to breaches from unauthorized "middlemen" or the like. Thus, the system and methods described herein are distinct from peer-to-peer file sharing, decentralized storage using "unused" space of the public, or the like.

As shown, the system according to certain embodiments may include one or more blockchain data handlers 105 configured to perform any of the operations described herein. For example, in some embodiments, the blockchain data handlers 105 (or the overall blockchain system) can include an object query language (OQL) module, a hash (or Merkle) tree module and a blockchain module. The object query language module may perform a variety of functions, including, but not limited to:
Storing, creating and/or maintaining rules for object, namespace, collection and dataset behavior
Configuration and management
Application integration point
Namespace definition
User creation and roles assignment
Enables both early and late binding of user defined metadata According to certain embodiments, the hash (or Merkle) tree module may perform a variety of functions, including, but not limited to:
Prefetch/cache coordination
Auto-consistency checking/lightweight consistency checking
Integrated capacity audit
User defined meta data logging
Fine-grained access control
Flexible leafnode list (flexible replica or sharding strategy)
Auto data locality—for either type of data sovereignty, storage in particular localities, or access only from particular end-points
Transitionally consistent modifications/reporting/auditing/testing
Proof of immutability In other embodiments, the hash (or Merkle) tree module may perform a variety of functions, including, but not limited to:
Guaranteed eventual consistency
Integrated audit capability
Secure, granular sharing
Guaranteed write consistency amongst autonomous nodes
Permanent ledger logging for aiding audit rules
Access enforcement
Multi-tenant isolation
Consumer visibility into risks and tradeoffs.

According to certain embodiments, the devices and modules of FIG. 1, such as the blockchain handlers 105 and other nodes illustrated in FIGS. 1-5, can be interconnected by any suitable network. The network can be any type of network (e.g., a local area network (LAN), a wide area network (WAN), a virtual network, and a telecommunications network) implemented as a wired network and/or wireless network. As described in further detail herein, in some embodiments, for example, the devices and/or modules can be connected to each other via an intranet, an Internet Service Provider (ISP) and the Internet, a cellular network, and/or the like.

Figure 2:
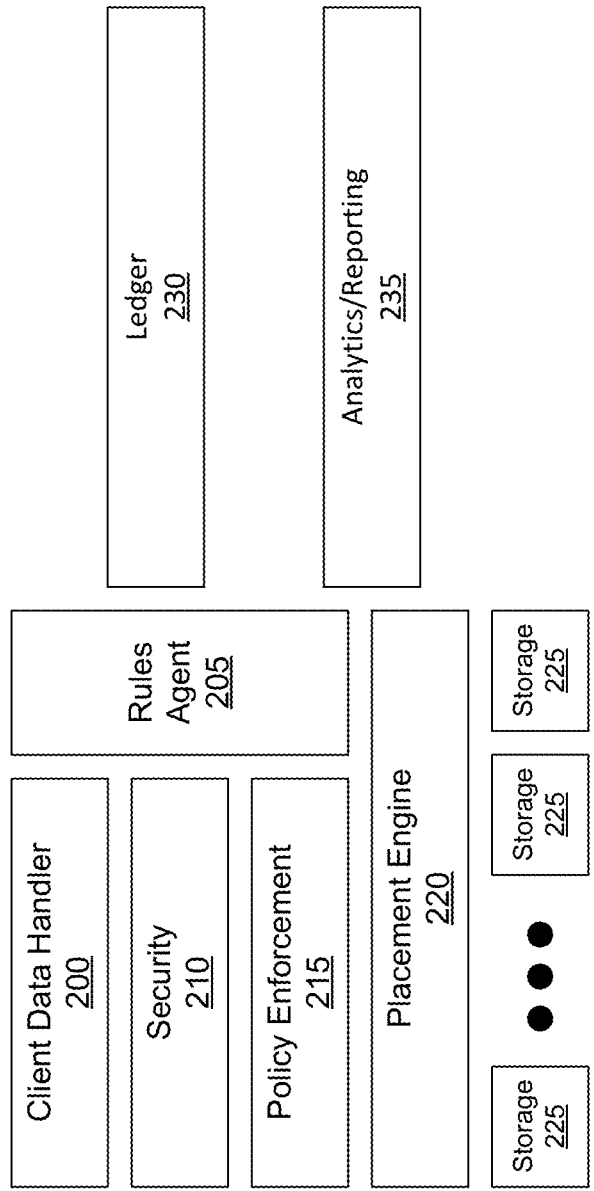
FIG. 2 is a logic diagram showing a software stack according to certain embodiments.

FIG. 2 illustrates a software architecture according to certain embodiments. The software architecture may include a client data handler 200. In certain embodiments, the client data handler 200 may scale independently, and may be used to manage client connections and prepare the data and metadata for their unique lifecycles. The software architecture may also include a rules agent 205, which may be a separate interface for establishing users, namespaces, and data pipelines.

According to certain embodiments, the software architecture may further include a security layer 210. The security layer 210 may be a separate layer that allows security and authentication to scale, as well as the location that nefarious users that are redirected to a honeypot. Further, the software architecture may include a policy enforcement layer 215. In certain embodiments, the policy enforcement layer may ensure that the transactions are valid, and that they do not violate any of the existing rules for handling blockchain data. Also illustrated in FIG. 2 is a placement engine 220. According to certain embodiments, the placement engine 220 may be responsible for routing the transactions to the appropriate storage node(s) 225. Further, when a policy is altered, the placement engine 220 may re-layout the data on the appropriate storage nodes 225.

The software architecture of FIG. 2 may also include one or more storage nodes 225. According to certain embodiments, the storage nodes 225 may be physical nodes with different design points. For example, some storage nodes 225 may be optimized for long-term durable storage, while other storage nodes 225 may be optimized for active processing. The software architecture of FIG. 2 may also include one or more ledgers 230. According to certain embodiments, the ledger 230 may be an independent blockchain layer that allows all the transaction states to be logged and audited. FIG. 2 further illustrates an analytics layer 235. The analytics layer 235, according to certain embodiments, may be a reporting layer that allows an authorized user the ability to see all of the transactions for a given namespace, and not just the current state of the system. This may enable the system to gain compliance with different organizations worldwide.

Figure 3:
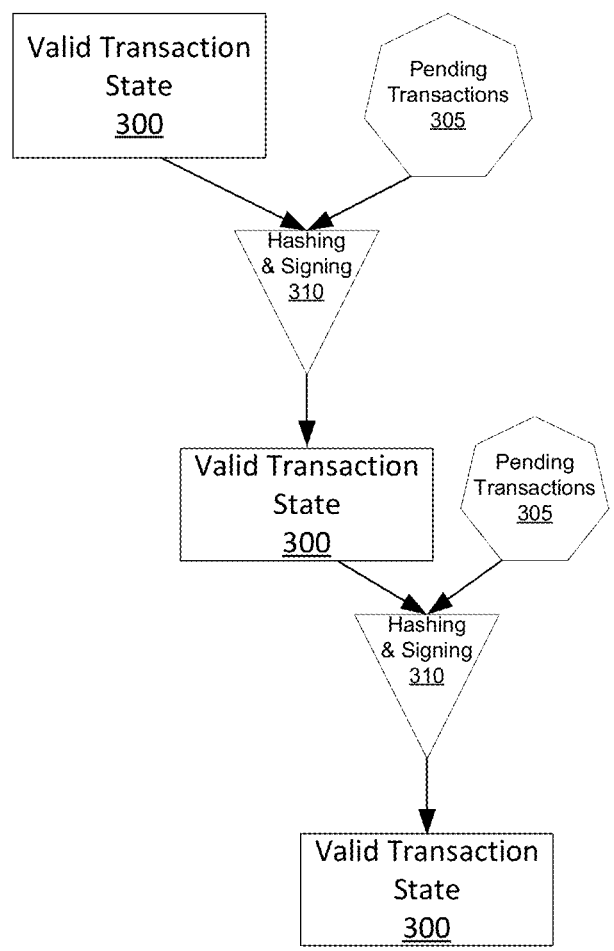
FIG. 3 is a schematic illustration the implementation of a blockchain for data transactions according to certain embodiments.

FIG. 3 is a schematic illustration of the implementation of a blockchain for data transactions, according to certain embodiments. The blockchain illustrated in FIG. 3 may include a valid transaction state 300. The valid transaction state may represent either a state at some point in time where all transactions have been validated, and a cryptographically signed block is generated. This may also apply to the initial state of the ledger as it is first instantiated.

FIG. 3 further illustrates that the blockchain may include a pending transactions log 305. The pending transactions log 305 may include a log of all of the outstanding transactions that are pending insertion into the ledger. In certain embodiments, there may be relatively few of these for ledgers that are infrequently used, or a very large number for ledgers that are receiving very large numbers of transactions. Further, the blockchain may include a hashing and signing procedure 310. According to certain embodiments, the hashing and signing procedure 310 may include a process of hashing and signing all valid transactions. This process may take all of the metadata transactions for a given ledger that have not been committed, and validate them, encrypt them, and create a new leaf in the Merkel tree out of these new transactions, and the hash of the last block in the ledger.

According to some embodiments, any of the blockchains or ledgers described herein can be produced using a bitmask. The state illustrated in FIG. 3 can be stored in a hash tree produced.

Figure 4:
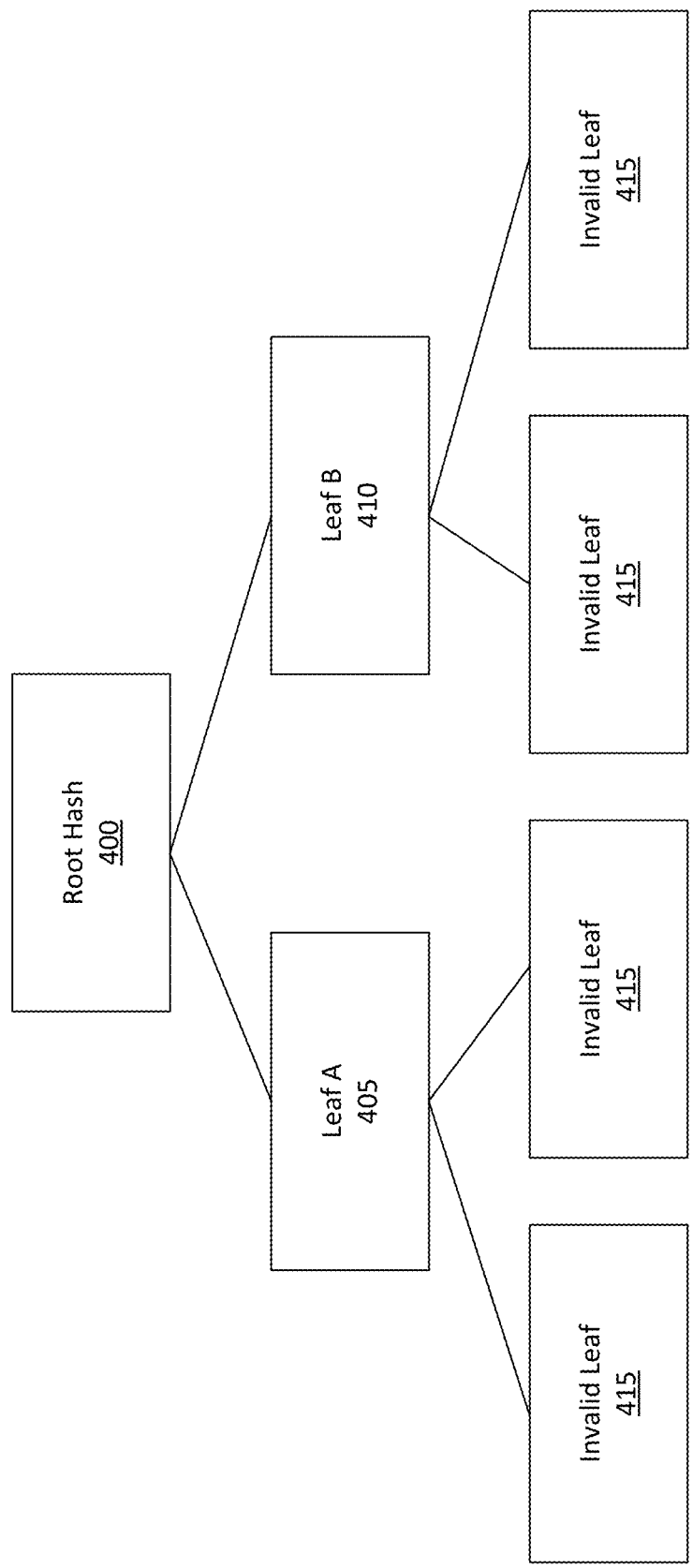
FIG. 4 is a schematic illustration of a hash (or Merkle) tree according to certain embodiments.

FIG. 4 is a schematic illustration of a hash (or Merkle) tree, according to certain embodiments. The Merkle tree may serve two primary purposes. As described below, any attack or modification to a transaction automatically results in the production of a private node/tree thus isolating the "fault." The other function is that for a namespace to be rendered in any location that is valid, only the leaf nodes associated with that namespace need to be available. By separating the meta-data transactions from the data transactions, an automatic and free deduplication may ensue. Additionally, data integrity is automatic, any two adjacent leaves can re-create a missing sister or parent.

As illustrated in FIG. 4, the Merkel tree may include a root hash 400. The root hash 400, according to certain embodiments, may be formed of all of the leaf nodes in the Merkel tree adjacent to the root, and that are hashed together. The Merkle tree may also include Leaf A 405 and Leaf B 410. In standard left hand-right hand notation, the left member of an upper hash is referred to as Leaf A 405, and the left hand side of the pair is referred to as Leaf B 410, where the pair is created by hashing a subordinate Leaf A 405 and Leaf B 410 together.

As further illustrated in FIG. 4, the Merkel tree may include an invalid leaves 415. According to certain embodiments, an invalid leaf 415 may be modified and no longer hashes out to the same value as it originally did. The invalid leaf 415 may be detectable by the parent node as it's value no longer is correct. In turn, the root hash also is invalid. According to such a method, it may be possible to quickly detect errors, and isolate the error from where it originated.

Figure 5:
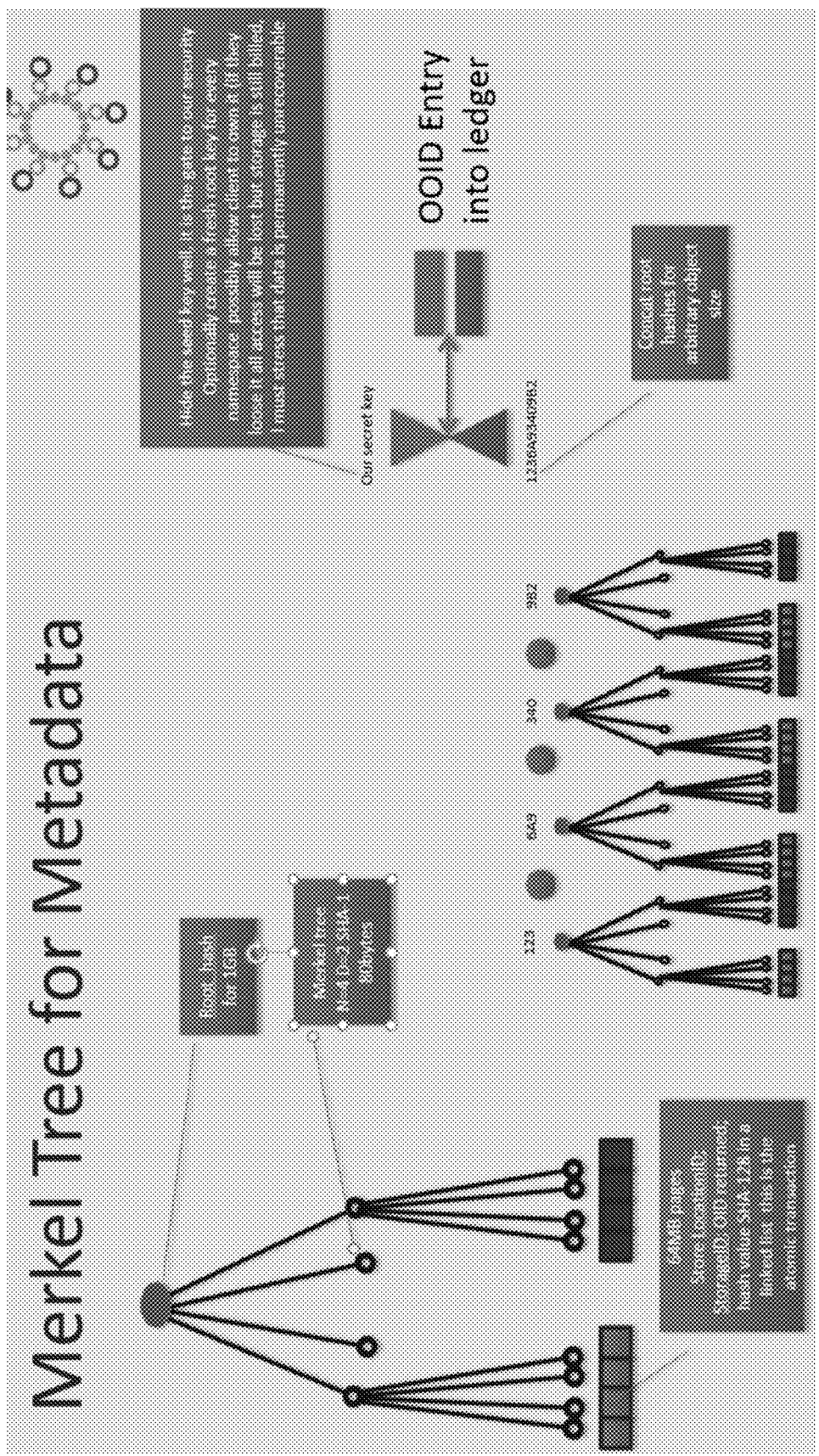
FIG. 5 is another schematic illustration of a hash (or Merkle) tree according to certain embodiments.
Figure 9:
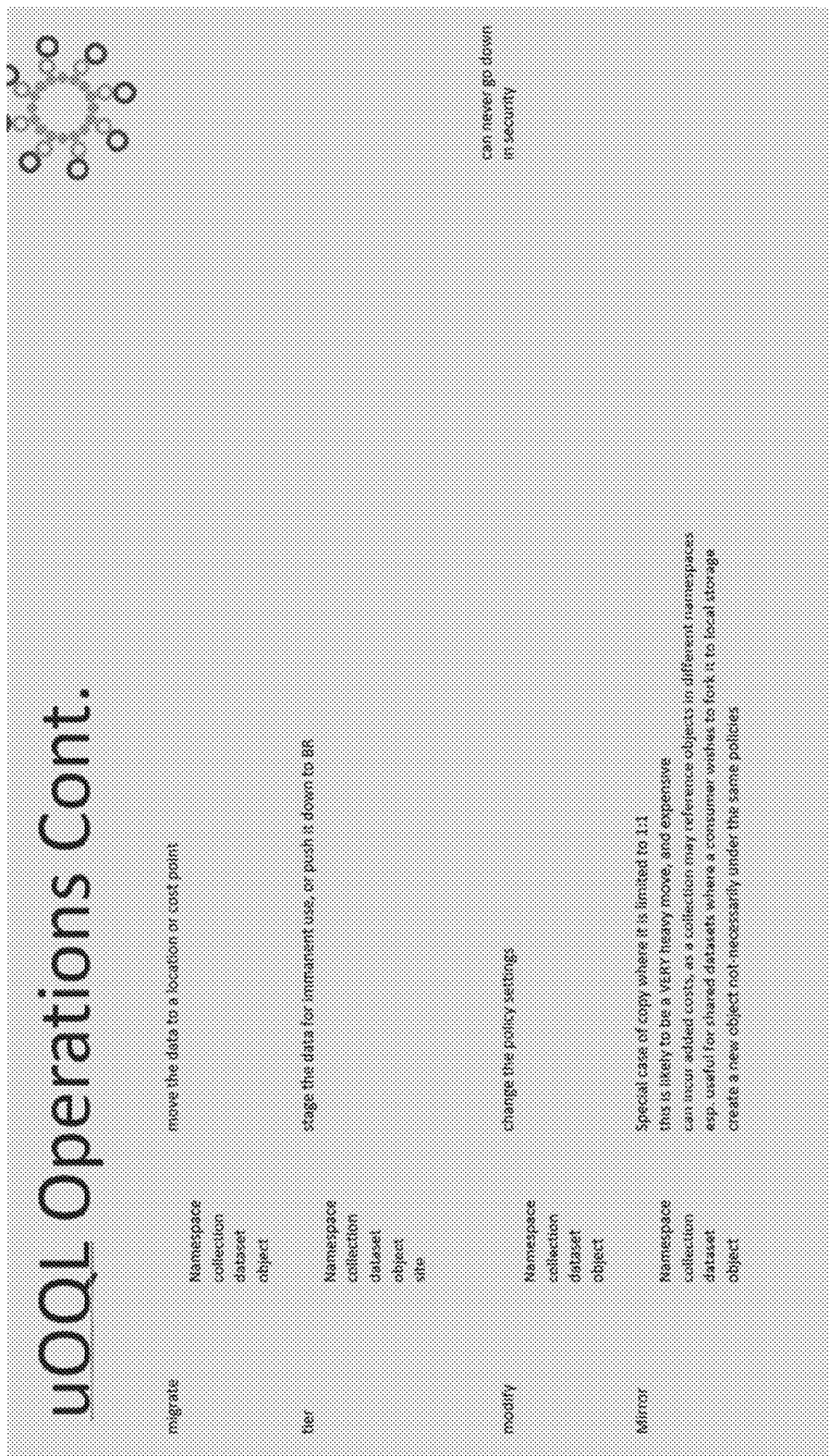

FIG. 5 is another schematic illustration of a hash (or Merkle) tree, according to certain embodiments. Collectively and/or individually, these systems and/or modules perform the functions described herein, including, but not limited to preserving data integrity in view of increasing issues of data sovereignty, providing a secure system for tracking data transactions, and applying "proof of existence" to data and/or data transactions.

In some embodiments the system can be associated with multiple different client applications (or end points). Specifically, the systems and methods described herein can operate to serve multiple different clients. In such embodiments, the blockchain module can produce a different root key for the "chain" that is unique for each different client.

For example, in certain embodiments, an entity may own a main ledger. When the entity takes on client A, a unique entry for client A is created. The entry may be used along with the OQL rules initially set up to create a unique root key that will be the basis of a client ledger, otherwise known as a rooted side chain. Rather than the normal use of these side chains (hacker isolation or to test new ledger rules), it may be possible to allow the side chain to live in perpetuity. Further, each unique ledger may have its own Merkel hash, and is valid from root to latest ledger block. To make any alterations to the metadata of the ledgers (new or modification), the entire tree must be recalculated and verified. Thus, by creating many smaller trees, it may be possible to reduce latency, increase parallelization and scalability.

In this manner, the data transactions for each client may be maintained in a separate chain and/or shared ledger from that produced for each of the other clients. By producing a separate ledger or blockchain for each client, the overall length of the chain can be minimized (as compared to a single chain associated with all clients) and the compute resources needed to implement the block chain (e.g., proof of work to validate a transaction, proof of existence for each transaction, or the like) can be minimized.

In some embodiments, the blockchain methods and systems described herein can implement "proof of existence" for each transaction. Proof of existence may include identifying the "hash" (e.g., that is produced by and/or included within the hash tree module) of associated with a data transaction, and storing that hash in the blockchain. Since the blockchain stores all of the valid transactions confirmed, and all hashes are unique, after that transaction is confirmed being valid, it can be referenced at a later time to prove that a particular document exists.

In some embodiments, the methods and systems described herein may add an entry to the ledger (or blockchain) for each valid transaction. The ledger may be distributed to those end points associated with the client. In the event of an invalid (or unauthorized) transaction, a "side branch" (or "fault branch") may be added to the ledger, thus easily identifying the transaction as being invalid to the client.

A use case is described below with respect to serving the needs of the enterprise top tier of a client. To effectively meet the needs, a system and method for keeping an auditable record or data integrity and data placement may be used. In some embodiments, the method may include the blockchain methods described herein.

In use according to certain embodiments, a name space is a construct to allow a user (e.g., a client) to create some rules that all objects, such as data blocks, should initially adhere to, and given no other inputs should revert to. For example, one such rule would be "store-for-50 years" on archival media. But a later policy could come in for any object in the afore mentioned namespace and ask to have the object move to hot tier, or even on-premises. The original policy of store for 50 years shall not be violated, and thus only a replica would be sent out to the edge. When the user is done with the data at the edge, it can safely be dropped and the namespace returns to a static state. Each of these transitions may be represented by an entry in the blockchain ledger. In certain embodiments, metadata ledgers as blockchains may have greater ramifications than updating the access and replicating metadata. As another example, a later policy can be related to a data sovereignty regulation passed by a particular country. Again, the initial rules remain in force, the system protects the data from being compromised by any such regulations.

In the above example, if the sovereignty layout rules are modified, the data may now reside in part outside of the new rule. Those portions that are no longer in compliance may be re-laid out onto archival media that fits the rules. Alternatively, those portions that no longer comply may be destroyed. Further, if the rule change is one that cannot be adhered to by the system, a mechanism for reporting may be triggered, and the user is informed that some portion of the data is at risk for this new policy.

As described herein, in some embodiments, a transparent ledger (or blockchain) is produced for the end user to verify and validate that all items (e.g., datablocks) in the system are in accordance with the rules they set forth in the beginning (e.g., via the OQL module). In producing the blockchain ledger, the system can be thought of as the "buyer" (said in terms of tracking real transactions). Thus, the object (or data) upon upload will behave in a default policy, after upload has completed, make an off-premise replica, and protect it with a second replica. Now the name space rule has a secured object to start working on. In certain embodiments, the namespace rules may be wide and varied.

According to certain embodiments, the system being through of as a buyer, and all clients as sellers makes it easy to validate the transaction. If an end user wishes to add an object to the system, it can be said that they post an "intent to sell." When the system has the bandwidth, it may pick up that sale, apply the terms of the contract (store for 50 years, or keep inside my country, etc.), and completes the transaction by sending back an object ID that is universally unique. In addition, further transactions against that unique ID may be logged in the same manner, allowing either a most current view, or to audit a complete history.

As an example, consider that the namespace has a rule that data is to be stored on immutable media for 50 years. In this example, consider that there is one copy on-premises, and a mirror off-premises. Further consider that the network from off-premises to archival media is deemed preferred. One copy from the off-premises is then created on the archival media. Once this is completed, all three copies may be deleted, and the client is notified of completion (e.g., via the distributed ledger).

In such examples, when the client puts in a "request to sell" (e.g., to complete a data transaction, such as an upload or the like), the system may update the ledger each time it completes a step in making that sale come to fruition. The use of a ledger system (or blockchain system), as described herein provides a transparent, hack-resistant, reliable, and massively scalable way to handle the data "sell" request. When the object is first created, the client should not drop the original (i.e., erase the original bytes), but instead wait for the first ledger entry to be created. The first ledger entry can be created, for example, by the blockchain module or any other suitable module. At this juncture, the off-premises replica is completed. Using this procedure, there is no time where the data is exposed to loss. In some embodiments, the client can wait for either the next entry (remote-mirror created) or the final entry. This level of granularity allows the client to choose their own risk tolerance and not create a reliance on time or other blind assumption that the data is protected in accordance to their desired policy.

As another example, a rule-override can be provided to the system, for example, to produce a cache a copy. Such override transactions would also be an entry in the ledger, and the system would dutifully recall the archived data, and make a copy on the appropriate media for the client to get access to it. Once that action of copy is completed, the transaction is completed and registered in the ledger.

If, however, a rouge user issues a request to delete the data, such request would be entered into the ledger. Upon examination (assuming 50 years has not passed) the request would be found to be in violation and denied. The user (e.g., an admin of the user) will see this request, and that the system cannot comply with it, and a fingerprint of who issued the request. In this manner, the users-admin now has an auditable way of discovering rouge users.

Producing a transparent distributed ledger can also have other uses, such as, for example, billing and internal auditing. As an example, consider the following arbitrary cost values to objects in different places: the initial on-premises version is $10 per unit, the off premises is $5 per unit, and the archival $1 per unit. Thus, a user upload a unit of data, which costs $10, a remote replica is made (costing $5), and a mirror version is produced ($5). Using these assumption, to date the client has spent $20 for this unit of data. Now an archival copy is created, and the sources dropped. Thus the cost for this unit drops to $1. Then a user who is authorized to get data makes a request to recall it to on-premises and make 3 copies. Suddenly the bill will jump from $1 to $30 per unit for the recalled and replicated units. The users-admin will see this via the distributed ledger, and be enabled to either exercise an in-house recharge system, or if it is deemed excessive, go to the end user who made the request and have them revoke the policy request, or at least reduce the number of copies.

Aside from these very tenable external use cases for a shared ledger system, there are some other internal features that become incredibly simplified. Billing is one, data validation/verification (proof of data integrity) is another, and pre-fetching/staging of data is yet another.

The hash tree module (as illustrated also in the hash tree schematic illustrations of FIGS. 4 and 5) can facilitate many improved methods for data handling. For example, maintaining a hash tree for all units of data provides a simple accounting of the size of the hash. Further, use of a moderate to strong hash value for the objects allows for in-flight verification, and if a strong mechanism is used, even in-flight correction of invalid data becomes a simple process.

Referring to FIGS. 4 and 5, organizing these trees in an intelligent manner allows for detection of request patterns rapidly, and thus caches can be populated more rapidly, with higher probability of accuracy than ever before. Thus, the user who wishes to use data may do so before the entire object is returned to the newly requested location. All other systems require the entire object to be reconstructed before I/O may commence.

Further enablement of a namespace, or an object in a namespace, with a public-private key structure is also enabled by the systems and methods described herein. Specifically, the user may add a tag that the data can only be accessed with a key. This key is registered in the ledger. If at a later time the owner of the key wishes to grant another user rights to the object, they would ask the other user for their public key, add it to the ledger with their private key, thus granting the other user the ability to access the object. The other user can then make a request to create a copy of it in their namespace, or a cached copy, etc. and that fork is then noted in the original namespace ledger and the copy is created. A few examples of rules concerning how that copy is managed may include: Give-away (second user has rights in perpetuity), restricted access, or time-delimited access (meaning the second user has read rights for a specific time, or revocable by the owner at will, etc.) and many other combinations. For a revocable object, the new user will get an entry that includes reference to the original ledger. Once the original ledger receives a transaction removing the second users public key, access to the object is terminated.

A large corpus of immutable data exists in the scientific community, and has a life cycle that includes private, then add collaborating institutions, and eventually grants worldwide access. For instance, this may pertain to data flow that change over time. Certain embodiments of the ledger system may therefore be perfect for this and many other data flows, as discussed. Further, removing access restrictions entirely may involve either making public an independent public key, or tagging the key as a blank field. All of these state changes may be logged in the ledger, auditable, visible, and irrefutable.

In the above example, the public-private key structure may refer to access to non-encrypted data. If the user encrypts the data before upload, access to the encrypted data may still be granted. Thus, the decryption may still not be able to be completed. However, according to other embodiments, the data may be encrypted separately from the metadata ledger. For instance, ledger have a unique key for each of the user ledgers so that users cannot see into other users ledgers.

As another example of the blockchain systems and methods described herein, a user (or client) may desire to create a place to store data for 30 years, and at the end have the stored data automatically purged. Further, the user may require that the transactions be auditable to ensure compliance with the storage and purge. In some embodiments, the OQL module can be configured to allow this functionality. FIGS. 6-10 depict the policies, operations, and operands of an OQL module, according certain embodiments. In such embodiments, the OQL module may include three syntaxes: Rules, Operations, and Logic. As one example, the OQL may include, but not limited to the following:

create namespace alias=30 year_retention policies: retain=30 purge=true
   The return of the above would be the Name ID and it's Alias.

If the user wishes to store data in the namespace, then:
Open 30 year_retention; put <path to object being put>; close 30 year_retention
   Return is a durable OID that the user will keep for the duration of the object life or more.
   The purpose of adding the open and close statements is to batch up all the millions of objects in a single run and add a container around them.

If the user wishes to check that the policy is working, then:
open 30 year_retention; delete <OID>
   At this point the delete command will be sent to the specific object.
   The system will look into the metadata and see that the object was just written and has an immutability flag of 30 years. Thus, instead of deleting it, it will send a notification to the account owner of the violation, and reply to the user with an error.

If the user wishes to audit that the data is stored as expected, then:
open 30 year_retention; test <OID>
   Response is to seek the policy setting, and find the shards of the object and verify the policy settings have taken place.
   <OID> has policy of 30 year immutability, and is currently on an access node that does not comply with this rule. Specifically, because the data has just been written it has not yet been passed to the archive tier. Thus, if a second test performed at a set time after the initial test, then the result is: <OID> has a policy of 30 year immutability and is (as an example) sharded across 7 media libraries with an anticipated failure of $1.2^{\wedge}-36$, which well below the failure rate specified.

Now the user wishes to use the object for their year-end data run, then:
Open 30 year_retention; copy <OID> to <path to land it on>; close 30 year_retention
   Response is to retrieve the object and land it in the specified location. This example may be very user-interactive. In reality the likelihood is the query would be to find relevant data and stage it on the access box for examination.
Open 30 year_retention; migrate <dataset> to <siteID>, close. Given the immutable flag, this operation produces a working copy, but does not remove the original.

At the end of the 30 year period, then:
Open 30 year_retention; get <oid>. The response is an error indicating that the OID is no longer valid.

The above is just one example of the structure and function of the OQL module according to certain embodiments. In some embodiments, the OQL module may include a sufficient amount and type of primitives to achieve the desired business logic possibilities. For example, in some embodiments, the OQL module can include more than 20 primitives. In other embodiments, the OQL module can include more than 25 primitives. Further, in certain embodiments, the primitives may be the base structure of the language, and may not be broken into smaller components but instead may be used to create larger and more complex sentences that make up the rules. In other words, primitives may describe the smallest atomic unit of an API.

Some embodiments described herein relate to a computer storage product with a non-transitory computer-readable medium (also can be referred to as a non-transitory processor-readable medium) having instructions or computer code thereon for performing various computer-implemented operations, including any of the operations described herein and illustrated in FIGS. 1-12. It should be understood that the signals or blocks illustrated in FIGS. 1-11 may be implemented by various means or their combinations, such as hardware, software, firmware, one or more processors and/or circuitry. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Figure 11:
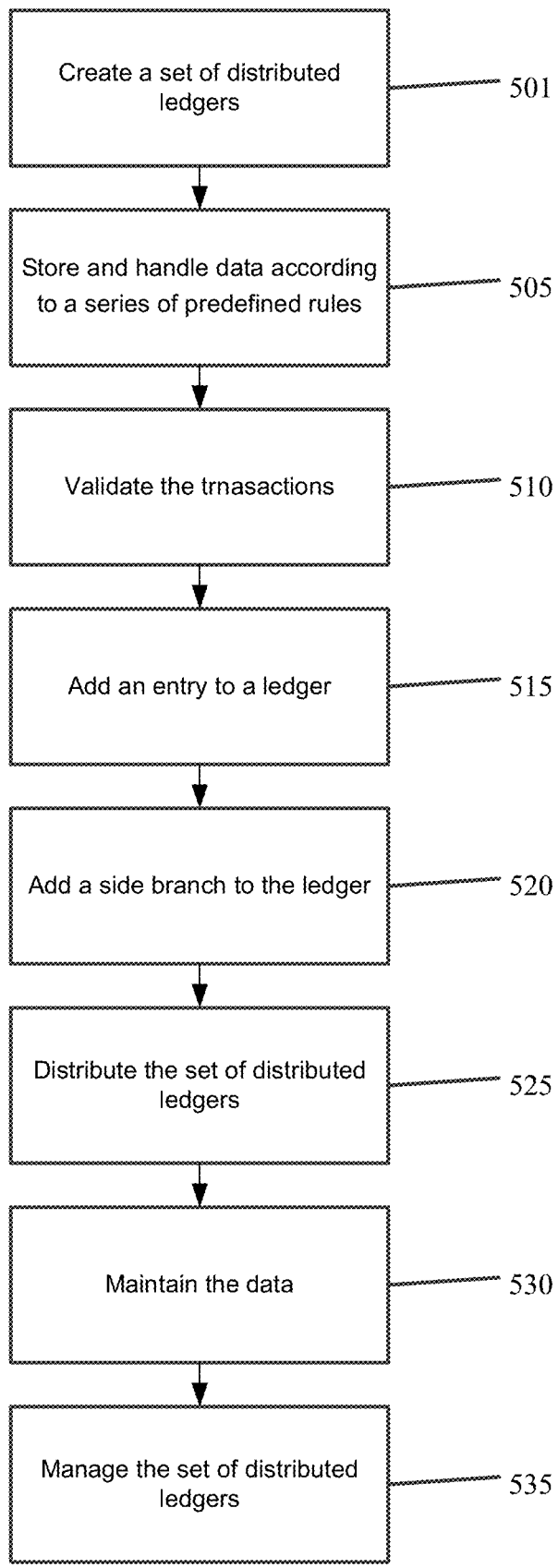
FIG. 11 illustrates a flowchart of a method according to certain embodiments.

FIG. 11 illustrates a flowchart of a method according to certain embodiments. The method illustrated in FIG. 11 includes, at 501, creating, at a network node, a set of distributed ledgers of transactions associated with a client of the integrated cloud-computing network. The method also includes, at 505, storing and handling data corresponding to the transactions according to a series of predefined rules. The method may also include, at 510, validating the transactions to see if the transactions comply with the series of predefined rules. The method may further include, at 515 adding an entry to a ledger of the set of distributed ledgers for each valid transaction. In addition, the method may include, at 520, adding a side branch to the ledger of the set of distributed ledgers for each invalid transaction. Further, the method may include, at 525, distributing the set of ledgers to an endpoint associated with the client.

As further illustrated in FIG. 11, the method includes, at 530, maintaining the data corresponding to the transactions for the client and data corresponding to other transactions for at least another client in separate ledgers. The method further includes, at 535, managing the set of distributed ledgers by implementing an object query language module, hash tree module, and a blockchain module. According to certain embodiments, each distributed ledger of the set of distributed ledger may include a unique root key that is specific to the client. In other embodiments, the series of predefined rules may include cryptographic rules, geographic rules, longevity rules, durability rules, or retention rules. Further, in other embodiments, the object query language module may be configured to receive a series of rules for the data handling, the hash tree module may be configured to produce a hash tree construct that records information about each transaction, and the blockchain module may be configured to produce a shared ledger that includes an entry representing each transaction.

Figure 12:
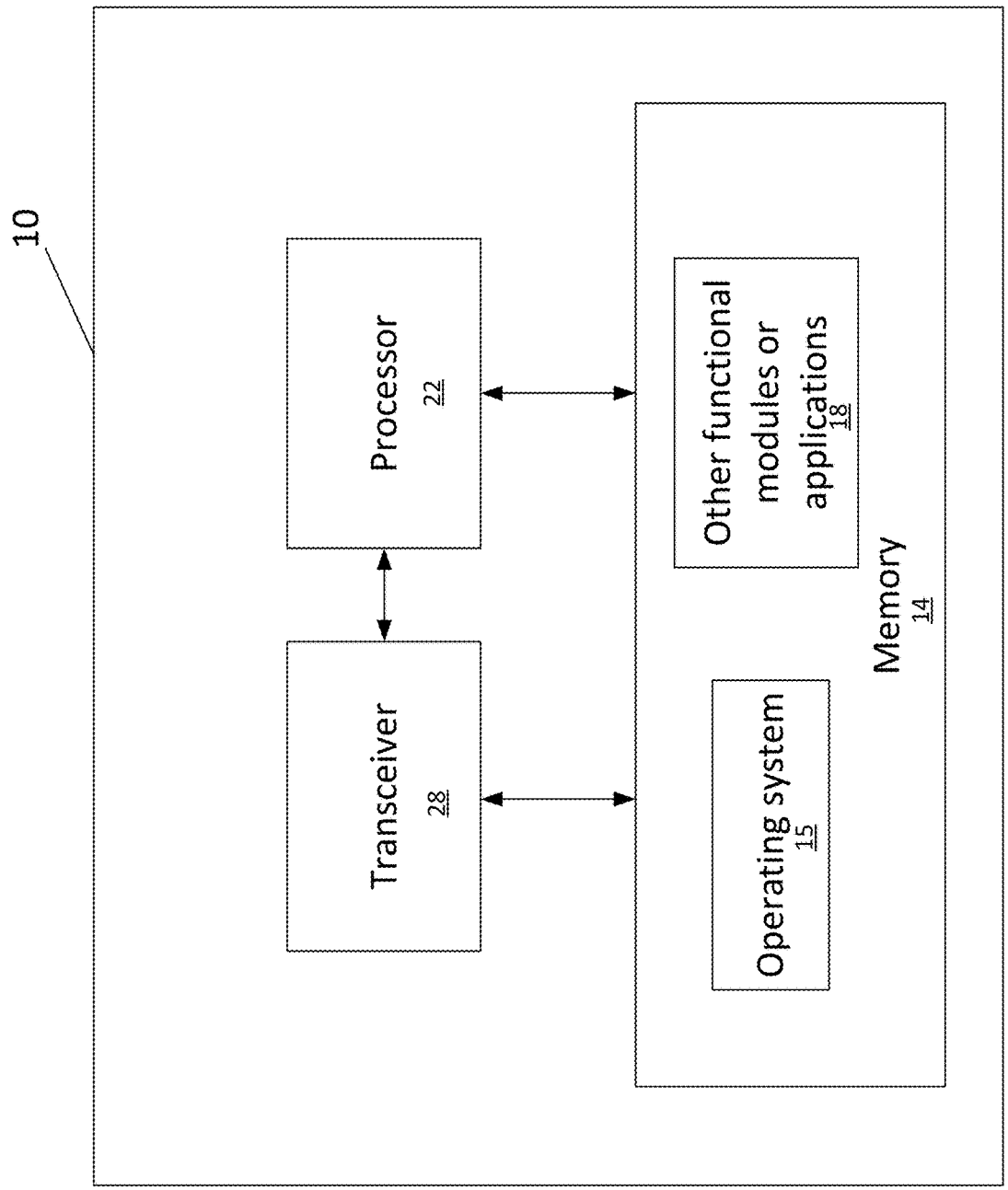
FIG. 12 illustrates an apparatus according to certain embodiments.

FIG. 12 illustrates an apparatus 10 according to certain embodiments. In one embodiment, apparatus 10 may include several devices, such as, for example, a blockchain handler, a client AP, or a network node such as a server, computer, or electronic mobile device or computer. In other embodiments, the apparatus 10 may be any component or unit illustrated in the blocks of FIGS. 1-4, and may operate either independently of each other, or in any combination with each other. Although only one apparatus 10 is shown in FIG. 12, in other embodiments, more than one apparatus 10 may be implemented together in various combinations as a system or independently as noted above.

Apparatus 10 may include a processor 22 for processing information and executing instructions or operations. Processor 22 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. Processor 22 may also be implemented as a single controller, or a plurality of controllers or processors.

For firmware or software, the implementation may include modules or unit of at least one chip set (for example, procedures, functions, and so on). Memory 14 may independently be any suitable storage device such as those described above. The memory and the computer program instructions may be configured, with the processor for the particular device, to cause a hardware apparatus such as apparatus 10, to perform any of the processes described above (see, for example, FIGS. 1-11). Therefore, as noted above, in certain embodiments, a non-transitory computer-readable medium may be encoded with computer instructions or one or more computer program (such as added or updated software routine, applet or macro) that, when executed in hardware, may perform a process such as one of the processes described herein. Alternatively, certain embodiments may be performed entirely in hardware.

According to certain embodiments, memory 14 may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. Examples of such memory may include those described above.

Apparatus 10 may also include one or more antennas (not shown) for transmitting and receiving signals and/or data to and from apparatus 10. Apparatus 10 may further include a transceiver 28 that modulates information onto a carrier waveform for transmission by the antenna(s), demodulates information received via the antenna(s) for further processing by other elements of apparatus 10. In other embodiments, transceiver 28 may be capable of transmitting and receiving signals or data directly.

According to certain embodiments, processor 22 may perform functions associated with the operation of apparatus 10 including, without limitations, any of the procedures described above and illustrated in the figures.

In other embodiments, memory 14 may store software modules that provide functionality when executed by processor 22. The modules may include an operating system 15 that provides operating system functionality for apparatus 10. Memory 14 may also store one or more functional modules 18, such as an application or program, to provide additional functionality for apparatus 10. The components of apparatus 10 may be implemented in hardware, or as any suitable combination of hardware and software.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some embodiments, a blockchain system and/or method includes data masking to render a namespace associate with a user at-will.

In some embodiments, an blockchain system and/or method is configured to journal metadata, as described herein.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method for handling data with distributed ledgers in an integrated cloud-computing network, comprising:
    creating, at a network node, a set of distributed ledgers of transactions associated with a client of the integrated cloud-computing network;
    storing and handling data corresponding to the transactions according to a series of predefined rules;
    validating the transactions to see if the transactions comply with the series of predefined rules;
    adding an entry to a ledger of the set of distributed ledgers for each valid transaction;
    adding a side branch to the ledger of the set of distributed ledgers for each invalid transaction; and
    distributing the set of distributed ledgers comprising the entry and the side branch to an endpoint associated with the client.

2. The method according to claim 1, wherein each distributed ledger of the set of distributed ledgers comprises a unique root key that is specific to the client.

3. The method according to claim 1, wherein the series of predefined rules comprises cryptographic rules, geographic rules, longevity rules, durability rules, or retention rules.

4. The method according to claim 1, further comprising maintaining the data corresponding to the transactions for the client and data corresponding to other transactions for at least another client in separate ledgers.

5. The method according to claim 1, further comprising managing the set of distributed ledgers by implementing an object query language module, a hash tree module, and a blockchain module.

6. The method according to claim 5,
    wherein the object query language module is configured to receive a series of rules for the data handling,
    wherein the hash tree module is configured to produce a hash tree construct that records information about each transaction, and
    wherein the blockchain module is configured to produce a shared ledger that includes an entry representing each transaction.

7. An apparatus, comprising:
    at least one processor; and
    at least one memory including computer program code,
    wherein the at least one memory and the computer program code are configured to, with the at least one processor, cause the apparatus at least to:
    create, at a network node, a set of distributed ledgers of transactions associated with a client of the integrated cloud-computing network;
    store and handle data corresponding to the transactions according to a series of predefined rules;
    validate the transactions to see if the transactions comply with the series of predefined rules;
    add an entry to a ledger of the set of distributed ledgers for each valid transaction;
    add a side branch to the ledger of the set of distributed ledgers for each invalid transaction; and
    distribute the set of distributed ledgers comprising the entry and the side branch to an endpoint associated with the client.

8. The apparatus of claim 7, wherein each distributed ledger of the set of distributed ledgers comprises a unique root key that is specific to the client.

9. The apparatus of claim 7, wherein the series of predefined rules comprises cryptographic rules, geographic rules, longevity rules, durability rules, or retention rules.

10. The apparatus of claim 7, wherein the at least one memory and the computer program code are further configured to, with the at least one processor, cause the apparatus at least to maintain the data corresponding to the transactions for the client and data corresponding to other transactions for at least another client in separate ledgers.

11. The apparatus of claim 7, wherein the at least one memory and the computer program code are further configured to, with the at least one processor, cause the apparatus at least to manage the set of distributed ledgers by implementing an object query language module, a hash tree module, and a blockchain module.

12. The method according to claim 11,
    wherein the object query language module is configured to receive a series of rules for the data handling,
    wherein the hash tree module is configured to produce a hash tree construct that records information about each transaction, and
    wherein the blockchain module is configured to produce a shared ledger that includes an entry representing each transaction.

13. A computer program, embodied on a non-transitory computer readable medium, the computer program, when executed by a processor, causes the processor to:
    create, at a network node, a set of distributed ledgers of transactions associated with a client of the integrated cloud-computing network;
    store and handle data corresponding to the transactions according to a series of predefined rules;
    validate the transactions to see if the transactions comply with the series of predefined rules;
    add an entry to a ledger of the set of distributed ledgers for each valid transaction;
    add a side branch to the ledger of the set of distributed ledgers for each invalid transaction; and
    distribute the set of distributed ledgers comprising the entry and the side branch to an endpoint associated with the client.

14. The computer program of claim 13, wherein each distributed ledger of the set of distributed ledgers comprises a unique root key that is specific to the client.

15. The computer program of claim 13, wherein the series of predefined rules comprises cryptographic rules, geographic rules, longevity rules, durability rules, or retention rules.

16. The computer program of claim 13, wherein the computer program, when executed by a processor, further causes the processor to maintain the data corresponding to the transactions for the client and data corresponding to other transactions for at least another client in separate ledgers.

17. The computer program of claim 13, wherein the computer program, when executed by a processor, further causes the processor to manage the set of distributed ledgers by implementing an object query language module, a hash tree module, and a blockchain module.

18. The computer program according to claim 17,
wherein the object query language module is configured to receive a series of rules for the data handling,
wherein the hash tree module is configured to produce a hash tree construct that records information about each transaction, and
wherein the blockchain module is configured to produce a shared ledger that includes an entry representing each transaction.

\* \* \* \* \*